United States Patent Office 2,752,362
Patented June 26, 1956

2,752,362
PROCESS FOR THE OXIDATION OF ETHYLENE

Ralph Landau, Roslyn Heights, N. Y., assignor to Chempatents, Inc., New York, N. Y., a corporation of Delaware No Drawing. Original application November 8, 1949, Serial No. 126,246. Divided and this application April 16, 1952, Serial No. 282,719

8 Claims. (Cl. 260—348.5)

The present invention relates to a preparation of ethylene oxide and more particularly to the direct partial catalytic oxidation of ethylene with molecular oxygen to form ethylene oxide.

This application is a division of my application Serial No. 126,246, filed November 8, 1949, now abandoned, entitled Catalyst for the Direct Partial Oxidation of Olefins.

In the commercial production of olefin oxides, the source materials which may be pure olefins or gaseous streams containing olefins in dilute concentration are caused to react directly with molecular oxygen to form the corresponding olefin oxide, at temperatures of 150° C.–400° C., in the presence of surface catalysts. The catalytic materials normally are packed into reactor tubes of desired dimension, the gaseous reaction stream being directed through the reactor tubes to accomplish the oxidation reaction.

Where the oxidation reaction is carried out under superatmospheric pressures, regardless of the concentration of olefin employed in the gaseous feed stock, a considerable pressure drop across the catalyst reactor tubes or bed occurs. This pressure drop may go as high as fifty pounds per square inch, resulting in a marked reduction of the effective flow rate of feed stock through the reactors. Moreover, with fresh catalyst, the flow rate of the gaseous feed stock may be double the flow rate with old catalyst. This is due primarily to the accumulation of carbonaceous materials on the surfaces of the catalyst particles in the reactor tubes, which impedes the gaseous flow and proportionately raises the pressure drop, as well as to the fluffing off of the silver catalyst which wedges between the particles.

Accordingly, with conventional processes for the oxidation of olefins, the catalyst must be removed from the system, cleansed and regenerated at frequent intervals, which is a costly and time consuming procedure. Moreover, from the standpoint of process efficiency, it is very important to maintain uniformity of flow of the gaseous stream through all of the reactor tubes, to obtain the optimum efficiency of operation and product yield, and eliminate the dangers inherent in plugged reactor tubes.

In the partial, direct oxidation of olefins by passing a mixture of olefins and molecular oxygen over an active silver catalyst, the rate of heat transfer from the surface of the catalyst is of extreme importance from the standpoint of control of the reaction and especially from the standpoint of maximum capacity of the reactor. Unless the heat of reaction is rapidly removed, hot spots develop which, in turn, cause a rapid increase in the reaction rate and liberation of heat to result in complete oxidation of the olefins.

It is an object of the present invention to provide a novel catalyst for use in the oxidation of gaseous olefins under pressures greater than atmospheric, which will markedly decrease the rate of pressure drop across the catalyst reactor tubes as the reaction proceeds, thereby improving the efficiency and production average of the catalyst over the life of the catalyst.

A further object is to provide a novel silver catalyst for use in oxidation reactors operating under pressure, which raises and stabilizes the capacities of the reactor units without sacrifice of product yield by greatly reducing the rate of increase of pressure drop across the reaction units over the life of the catalyst.

A further object is to provide a novel catalyst for use in the oxidation of olefins which initially offers a markedly reduced impedence to gaseous flow, and which is less susceptible to contamination by products of the reaction than conventional catalysts, thereby materially increasing the active life of the catalyst.

Another object is to provide a process for the partial, direct oxidation of olefins in which the capacity of the reactor is increased.

Still another object is to provide a catalytic process for the partial, direct oxidation of olefins in which the heat of reaction is rapidly removed from the surface of the catalyst to avoid formation of "hot spots."

Other objects and advantages of the invention will be apparent from the following detailed description taken in connection with the specific examples of the invention, which are given by way of example only and are not to be regarded as limitative of the invention.

In its broadest application, the invention comprehends the provision of a novel catalyst consisting essentially of silver carried upon the surface of an inert support, the surface of the catalyst being characterized by irregularities forming a rough skin. The catalyst support may further be characterized by lack of porosity within the body of the inert support, the support being essentially spherical in shape.

Catalysts prepared in accordance with the invention are characterized by a substantially increased surface area, with all activity concentrated on the surface of the catalyst rather than throughout the bulk of the support. The absence of pores inside the spheres prevents gradual reduction of the efficiency of the catalyst through blocking of the pores by carbonaceous materials, whereas the roughened surface of the catalyst markedly increases the area of catalytic activity. Under comparable conditions of operation, the spherical catalyst supports of the invention obtain yields of end product at least equal to yields obtained with conventional irregularly shaped porous catalysts, with markedly improved performance characteristics with resulting reduction in catalyst cost.

The catalyst supports of the invention may comprise materials characterized by stability against disintegration or other adverse effects under conditions of elevated pressures and temperatures, and which may be formed into spheres. It is further essential that the materials when formed into spheres, be capable of mechanical or other treatment to modify the surface characteristics thereof to present a roughened surface for receiving and retaining the silver catalyst. Best results are achieved employing a support material characterized by lack of porosity, in addition to the above requirements, which appreciably increases the active life of the catalyst. Examples of materials which may be employed in forming the catalyst supports include alumina (fused), aluminum silicate, mullite, magnesia and silicon carbide. Other preferred materials comprise zirconia and a porcelain comprised essentially of beryllium oxide, which will be referred to as beryllium porcelain. This latter material is characterized by high thermal conductivity approximately fifty times greater than the thermal conductivity of magnesia and alumina, approximately 38% of the thermal conductivity of copper at ordinary temperatures. This characteristic of beryllium porcelain assists markedly in the elimination of hot spots in the catalyst. The materials, zirconia and beryllium porcelain are claimed herein in connection with the preferred form of catalyst support employed in carrying out the invention as well as their use as catalyst supports per se.

The catalyst supports may be prepared in spherical form in any known manner, forming spheres preferably ranging in diameter from .20 inch to .50 inch. The size of the spheres may be decreased or increased from the preferred size range for particular uses. For commercial operations, a sphere size of .20 inch is preferred.

The spheres may be prepared by reduction of the raw materials to finely divided form, which are then extended or otherwise shaped into cylinders of approximately the desired dimension. The soft cylinders are then tumbled until they acquire a spherical shape. The spheres preferably are then tumbled in the presence of a fine powder of 40 mesh particle size more or less, composed of a volatilizable or ignitable material such as naphthalene. The spheres are then kiln roasted, the volatile powder adhering to the spheres being driven off, leaving the surface of each sphere in a highly roughened state, without modifying the overall spherical shape.

The roughened surfaces of the spheres as accomplished above, in no way modify the overall spherical shape of the spheres. The depth of the surface irregularities approximates between .005 to 0.05 of an inch, which enormously increases the effective surface area of the spheres. For example, with magnesia spheres of approximately one quarter inch in diameter, the true or apparent surface area will approximate 110 square inches per pound, containing roughly 560 spheres. The surface area of the roughened spheres, on the other hand, will approximate 579,000 square inches per pound, approximately 5,500 times the surface area of the unroughened spheres.

The roughening of the surfaces of the supports may be accomplished in any conventional way, other than the method described above, without departing from the invention.

The silver catalyst may be prepared in any conventional manner known to the art. The invention comprehends the use of a catalyst composed essentially of silver including metallic silver as well as silver compounds and silver in the presence of other compounds or elements. The silver component may be deposited on the spheres by the reaction of aqueous solutions of silver nitrate and sodium hydroxide in stoichiometrical proportions. Silver oxide precipitate is stirred up with the catalyst support and evaporated to dryness until the catalyst is deposited evenly over the roughened surface of the spherical support, providing a catalyst of maximum surface area of activity. The catalyst may be roasted for a short time at 300° C. or above in a controlled atmosphere to stabilize the catalyst. The oxide may be reduced with hydrogen to provide a silver metal coating, if desired.

Spherical catalyst supports prepared in accordance with the invention effect a much lower pressure drop across catalyst reactor tubes, than other typical catalyst support material such as aloxite, characterized by irregularity of shape and size. By way of example, a reactor tube with a one-half inch internal diameter and six feet long, was packed five feet six inches deep with 4–8 mesh aloxite (equivalent to between ¼″ and ⅛″ diameter). A gaseous reaction mixture was passed through the tube at two feet per second based on the empty tube at atmospheric pressure.

A similar tube was prepared with three-eighth's inch diameter silver coated alumina spheres. The following comparative pressure drops were observed:

Aloxite—20 mm. mercury pressure drop.
Alumina spheres—7 mm. mercury pressure drop.

By way of further example under higher operational pressures a reactor tube one inch in internal diameter was employed and filled with aloxite lumps approximately ⅛ inch diameter.

A gaseous reaction mixture was passed through the tube at 0.14 cubic feet per second measured at standard conditions at 300° C.

A similar tube was prepared with spheres of the invention ⅕ inch in diameter. The following pressure drops were observed:

Aloxite—3.1 lbs. per sq. inch per foot of tube height.
Spheres—1.5 lbs. per sq. inch per foot of tube height.

In typical oxidation reactions employing alumina spheres and aloxite particles as the supports, the following comparative results were obtained:

*Case I*

Catalyst: ⅜″ alumina spheres coated with silver oxide
Temperature: 270° C.
Flow at: 100 liters per hour
Inlet ethylene conc.: 5%
Inlet air conc.: 95%
Tube dimension: 1″ I. D.
Catalyst volume: 300 cc.
Percentage yield: 61%
Conversion per pass: 46%

*Case II*

Catalyst: ¼″ aloxite particles coated with silver oxide
Temperature: 270° C.
Flow at: 100 liters per hour
Inlet ethylene conc.: 5%
Inlet air conc.: 95%
Tube dimension: 1″ I. D.
Catalyst volume: 300 cc.
Percentage yield: 62%
Conversion per pass: 43%

It is evident from these data that the catalyst supports of the invention incur no loss in yield or conversion ratio, at the same time incurring a much lower pressure drop such as the ratio of one-third shown above compared with conventional catalysts.

The catalyst of this invention is particularly adapted for use in a recycle system in which a feed gas containing about 2 to 7½% ethylene is mixed with air, reacted and after completion of the oxidation reaction, residual unreacted olefin is recycled through the system, a portion of the gaseous stream being purged. All olefins present in purge gases are subjected to a second catalytic oxidation step to prevent loss of olefin to waste. This novel catalyst of the invention may be used advantageously in a process using moderate superatmospheric pressures to assist in the reaction of olefin and oxygen and separation of the olefin oxide product. The active life of the catalyst is prolonged due to reduction in the accumulations of carbonaceous products on the catalyst normally experienced in conventional processes or the lodging of solids in the crevices between adjacent catalyst particles.

The direct, partial oxidation of olefins, notably ethylene, by the reaction with molecular oxygen at a temperature which may range from 150° C. to 400° C., and preferably from 240° C. to 320° C. is an extremely sensitive one which must be carefully controlled to avoid complete oxidation to carbon dioxide and water. The formation of "hot spots" within the catalyst bed will cause virtually complete oxidation to carbon dioxide and water of all ethylene reacting in the vicinity of the hot spot. Since the formation of "hot spots" is favored by high reaction temperatures and rates, because of the difficulty in disposing of the heat of reaction, the maximum capacity of a reactor is to a large extent dependent upon the maximum conversions that may be obtained without the formation of hot spots.

Extensive test runs have shown a surprising increase in the maximum conversions that may be attained for long periods of operation without danger of hot spotting. The following examples are illustrative of the improvement in operation resulting from the use of the spherical coated catalysts.

*Case III*

A feed gas containing 4% ethylene was passed through a tube 20 feet long and 1 inch in diameter at a flow rate of 500 standard cubic feet per hour. The temperature was maintained at 270° C. The tube was packed with a graded irregularly shaped catalyst of silver on an aloxite support having an average particle size of 0.35 inch. The maximum concentration of ethylene oxide in the exit gas that could be obtained before the development of hot spots was 1.18%.

*Case IV*

A feed gas was passed through a reactor tube under conditions exactly similar to those present in Case III with the exception that the tube was packed with aloxite spheres of about 0.35 inch in diameter coated with silver. The maximum concentration of ethylene oxide in the exit gases that could be obtained before hot spotting was 1.4%, an increase of about 19% over that obtained with the irregularly shaped catalyst.

While the invention has been described with reference to specific exemplary details, it is not to be limited save as defined in the appended claims.

I claim:

1. In a process for the preparation of ethylene oxide by the catalytic selective partial oxidation of ethylene with molecular oxygen containing gas by reacting a feed gas mixture containing appropriate amounts of ethylene and oxygen together with inerts in the presence of a silver containing catalyst at a temperature in the range of 150–400° C. and recovering ethylene oxide product from he resulting gaseous mixture, the improvement which comprises carrying out said process in the presence of a catalyst arranged in fixed relationship in an elongated reaction zone, said catalyst comprising essentially silver disposed on the surface of substantially equal sized spherical support particles of a diameter in the range of about 0.2 to 0.5 inch having a rough outer surface, said spheres being prepared from finely divided refractory inorganic material and being capable of retaining their spherical form at kiln roasting temperatures.

2. A process of claim 1 wherein the refractory inorganic material is selected from the group consisting of zirconia fused alumina, mullite, magnesia, silicon carbide, and beryllium porcelain.

3. A process of claim 2 wherein the refractory inorganic material is mullite.

4. A process of claim 2 wherein the refractory inorganic material is alumina.

5. A process of claim 2 wherein the refractory inorganic material is magnesia.

6. A process of claim 2 wherein the refractory inorganic material is silicon carbide.

7. A process of claim 2 wherein the refractory inorganic material is beryllium porcelain.

8. A process of claim 2 wherein the reaction zone is tubular and of approximately one inch in diameter, and the support particles are of about 0.2 inch diameter and have substantially evenly spaced surface irregularities of a depth in the range of 0.005 to 0.05 inch.

References Cited in the file of this patent

UNITED STATES PATENTS

| | | |
|---|---|---|
| 2,125,333 | Carter | Aug. 2, 1938 |
| 2,134,543 | Andrews | Oct. 25, 1938 |
| 2,238,474 | McNamee | Apr. 15, 1941 |
| 2,384,942 | Marisic | Sept. 18, 1945 |
| 2,387,596 | Marisic | Oct. 23, 1945 |
| 2,404,438 | Evans | July 23, 1946 |
| 2,424,086 | Bergsteensson | July 15, 1947 |
| 2,458,266 | Heider | Jan. 4, 1949 |
| 2,526,689 | Rollman | Oct. 24, 1950 |
| 2,532,613 | Dutcher | Dec. 5, 1950 |
| 2,554,459 | Heider | May 22, 1951 |
| 2,604,479 | Rollman | July 22, 1952 |
| 2,606,160 | Heider | Aug. 5, 1952 |

FOREIGN PATENTS

| | | |
|---|---|---|
| 517,333 | Great Britain | Jan. 26, 1940 |
| 560,770 | Great Britain | 1943 |

OTHER REFERENCES

Sabatier: "Catalysis in Org. Chem.," Van Nostrand Co., N. Y. (1922), page 35.

Webster's New International Dictionary, 2nd ed. (unabridged), page 1806.

McKim: Canadian J. of Research, November 1949, vol. 27, Sec. B., No. 11, pp. 813–15.